Sept. 6, 1960 A. E. KOLBE 2,951,391
DISTRIBUTOR DRIVE AND THRUST BEARING THEREFOR
Filed Dec. 12, 1958
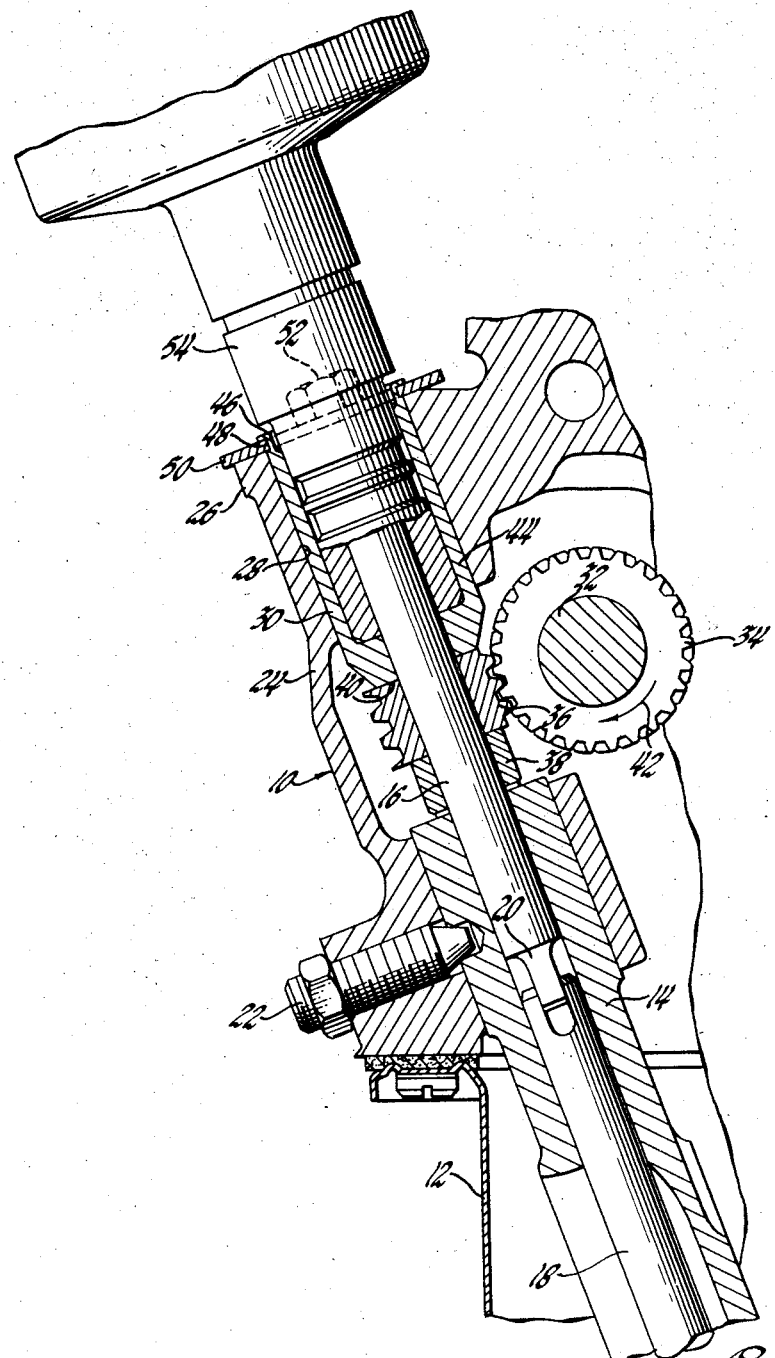
INVENTOR.
Adelbert E. Kolbe
BY
D.D. McGraw
ATTORNEY – # United States Patent Office

2,951,391
Patented Sept. 6, 1960

2,951,391
DISTRIBUTOR DRIVE AND THRUST BEARING THEREFOR

Adelbert E. Kolbe, Berkley, Mich., assignor to General Motors Corporation, Detroit, Mich., a corporation of Delaware Filed Dec. 12, 1958, Ser. No. 779,903

1 Claim. (Cl. 74—425)

The invention relates to a drive for the distributor of an internal combustion engine and more particularly to a drive in which the thrust exerted by the camshaft drive gear is in an upward direction. It has been quite common to manufacture distributor drives in which the thrust exerted on the distributor drive shaft by a camshaft distributor drive gear is in the downward direction in order that the thrust may be readily transmitted to the shaft and the block without having it pass through the distributor and distributor housing. This has been accomplished by using an idler gear in the camshaft gear train so that the camshaft rotation is in a direction to exert the downward thrust. When a camshaft is driven by a chain, for example, it is rotated in the same direction as the engine crankshaft and in conventional arrangements will exert an upward thrust on the distributor drive. In order to prevent the distributor drive shaft from spinning upwardly and becoming disengaged, a split-arm type of distributor has been provided which will take the thrust against the distributor shaft and return it to the engine block. This construction has resulted in a more expensive distributor and one which is more likely to need repair as well as being more difficult to adjust.

The distributor drive and bearing embodying the invention permits the use of an upward thrust drive connection and also permits the use of the same type of distributor now commonly used on downward thrust installations and avoids the use of the more costly split-arm type of distributor otherwise required. The distributor driving shaft is driven by a gear mounted on the shaft but is required to transfer no axial thrust. A thrust bearing is provided in the engine block which is engaged by the distributor shaft gear and transmits the entire axial thrust to the outer surface of the engine block in which the bearing is installed. The distributor is permitted to float freely within the bearing in the same manner as the distributor shaft with which a downward thrust mechanism is used.

In the drawings:

The figure shows a partial section view of a distributor drive and thrust bearing embodying the invention and having parts broken away and in section.

The engine block 10 is shown as having an oil pan 12 secured to the lower side thereof to provide an oil sump in which the oil pump may be mounted. A sleeve 14 is removably secured to the interior of the engine block and provides means for mounting the lower end of the distributor drive shaft 16 and the upper end of the oil pump drive shaft 18. Shaft 18 is driven by the distributor drive shaft 16. A sliding connection 20 of a suitable type is provided by the two shafts in order to permit a limited amount of relative axial movement between the shafts without impairing the rotational drive. The sleeve 14 may be secured in place by the lock screw 22.

The side wall 24 of the engine block 10 is provided with a boss 26 through which a pilot passage 28 is formed. This passage is in alignment with the passage in sleeve 14 and receives the thrust bearing 30 therethrough.

The camshaft 32 is rotatably mounted in the engine block 10 in any well-known manner and is provided at a suitable point along its length with a distributor drive gear 34. The gear 34 of camshaft 32 is in meshing engagement with the distributor drive gear 36 which is nonrotatably secured to the distributor shaft 16. Gear 36 is helically formed in order to receive its rotational drive from the gear 34 at the requisite angle. This is required since the axis of the distributor shaft 16 and the axis of the camshaft 32 do not intersect and are usually positioned at substantially right angles to each other in the longitudinal plane of the engine.

A bushing or spacer 38 may also be provided on distributor shaft 16 underneath gear 36. Spacer 38 holds gear 36 in the proper position for continuous meshing engagement with gear 34 when the engine is not running. Thrust bearing 30 is provided with a thrust surface 40 at its lower end which is engageable with the upper surface of gear 36 when camshaft 32 is rotating in the clockwise direction, indicated by arrow 42. Bearing 30 is generally cylindrical and annular along its intermediate portion 44 and extends upwardly out of the boss 26. The upper end 46 is provided with an external recess 48 in which the annular flange 50 is received. The extreme end of bearing 30 may be spun over the flange 50 to provide the recess 48 after the flange is in position. Flange 50 is secured to the engine block by any suitable means such as the bolt 52.

The distributor shaft 16 extends outwardly beyond flange 50 and into the distributor casing 54 to drive the distributor rotor. Casing 54 extends downwardly about shaft 16 and is received within the cylindrical portion 44 of bearing 30. Suitable means for securing the distributor casing against rotation may be employed as desired and form no part of the invention.

The upward thrust on gear 36 is transferred to thrust surface 40 of bearing 30 and is transmitted through bearing portion 44 to flange 50. Since this flange is secured to the engine block, the thrust force is transferred to the block through bolts 52. This permits the distributor to float freely within the thrust bearing 30 and to have no axial thrust forces exerted requiring the distributor to be anchored to the engine block against such forces.

What is claimed is:

In an internal combustion engine having an engine block with a distributor drive passage formed therein, a distributor drive and thrust bearing mechanism comprising a floating distributor casing and a distributor drive shaft extending downwardly therefrom, a generally cylindrical bearing having the lower end thereof closed, said bearing being removably received in said block distributor drive passage and freely receiving a portion of said distributor drive casing therein and receiving said distributor drive shaft through an aperture formed through said bearing closed end, a driven gear secured to said distributor drive shaft adjacent said bearing closed end and in abuttable bearing relationship therewith, a drive gear engaging said driven gear for driving said distributor drive shaft, said drive gear exerting an upward thrust through said gear and said bearing when driving said distributor drive shaft, said bearing having a flange secured to its upper end and disposed externally of said engine block and secured to said engine block for transmitting upward thrust loads from said driven gear and bearing to said engine block.

References Cited in the file of this patent
UNITED STATES PATENTS

| | | |
|---|---|---|
| 1,560,329 | Schulze | Nov. 3, 1925 |
| 1,587,201 | Tenny | June 1, 1926 |
| 1,759,436 | Chryst | May 20, 1930 |
| 2,666,335 | Clayborne | Jan. 19, 1954 |

FOREIGN PATENTS

| | | |
|---|---|---|
| 594,392 | Great Britain | Nov. 10, 1947 |